United States Patent [19]

Bliesner et al.

[11] Patent Number: 5,056,741
[45] Date of Patent: Oct. 15, 1991

[54] APPARATUS AND METHOD FOR AIRCRAFT WING STALL CONTROL

[75] Inventors: Wayne T. Bliesner, Snohomish; Timothy Wang; Ronald C. Stoner, both of Bellevue, all of Wash.

[73] Assignee: The Boeing Company, Seattle, Wash.

[21] Appl. No.: 415,178

[22] Filed: Sep. 29, 1989

[51] Int. Cl.⁵ .............................................. B64C 3/50
[52] U.S. Cl. .................................... 244/214; 244/210; 244/219
[58] Field of Search ............... 244/214, 210, 211, 219, 244/35 R

[56] References Cited

U.S. PATENT DOCUMENTS

| | | |
|---|---|---|
| 2,041,793 | 5/1936 | Stalker . |
| 2,070,006 | 2/1937 | Eaton Jr. et al. . |
| 2,498,262 | 2/1950 | Garbell .................. 244/35 R |
| 2,702,676 | 2/1955 | Delaney Jr. . |
| 2,709,052 | 5/1955 | Berg ...................... 244/35 R |
| 2,743,888 | 5/1956 | Lippisch . |
| 2,769,602 | 11/1956 | Furlong . |
| 2,793,826 | 5/1957 | Fiedler . |
| 3,370,810 | 2/1968 | Shevall et al. . |
| 3,486,720 | 12/1969 | Seglem et al. ............. 244/210 |
| 3,523,661 | 8/1970 | Rethorst . |
| 3,638,886 | 2/1972 | Zimmer . |
| 4,032,087 | 6/1977 | Cleaves . |
| 4,189,120 | 2/1980 | Wang ..................... 244/214 |
| 4,293,110 | 10/1981 | Middleton et al. . |
| 4,323,209 | 4/1982 | Thompson . |
| 4,378,922 | 4/1983 | Pierce . |
| 4,384,693 | 5/1983 | Pauly et al. ............... 244/214 |
| 4,553,721 | 11/1985 | Jorgensen . |
| 4,702,441 | 10/1987 | Wang . |
| 4,858,852 | 8/1989 | Henne et al. ............. 244/35 R |

Primary Examiner—Joseph F. Peters, Jr.
Assistant Examiner—Christopher P. Ellis
Attorney, Agent, or Firm—Hughes & Multer

[57] ABSTRACT

An aircraft swept wing which provides pitch stability during stall conditions. In a swept wing aircraft which has leading edge flaps which in their deployed position forms a slot between the slot and the leading edge portion of a fixed main wing structure, the configuration of said leading edge portion is varied spanwise to vary the localized aerodynamic pressure spanwise along the wing. Increased bluntness of said leading edge portion, or increased slot-gap width, creates a stall condition on an inboard portion of the wing which approximates, at increasing angles of attack, the lift and pitching moment changes simultaneously experienced on outboard portions of the wing. As a result, adverse nose-up pitching moment under stall conditions is avoided, and improved pitch stability is achieved in swept wing aircraft, without compromising maximum lift capability.

17 Claims, 10 Drawing Sheets

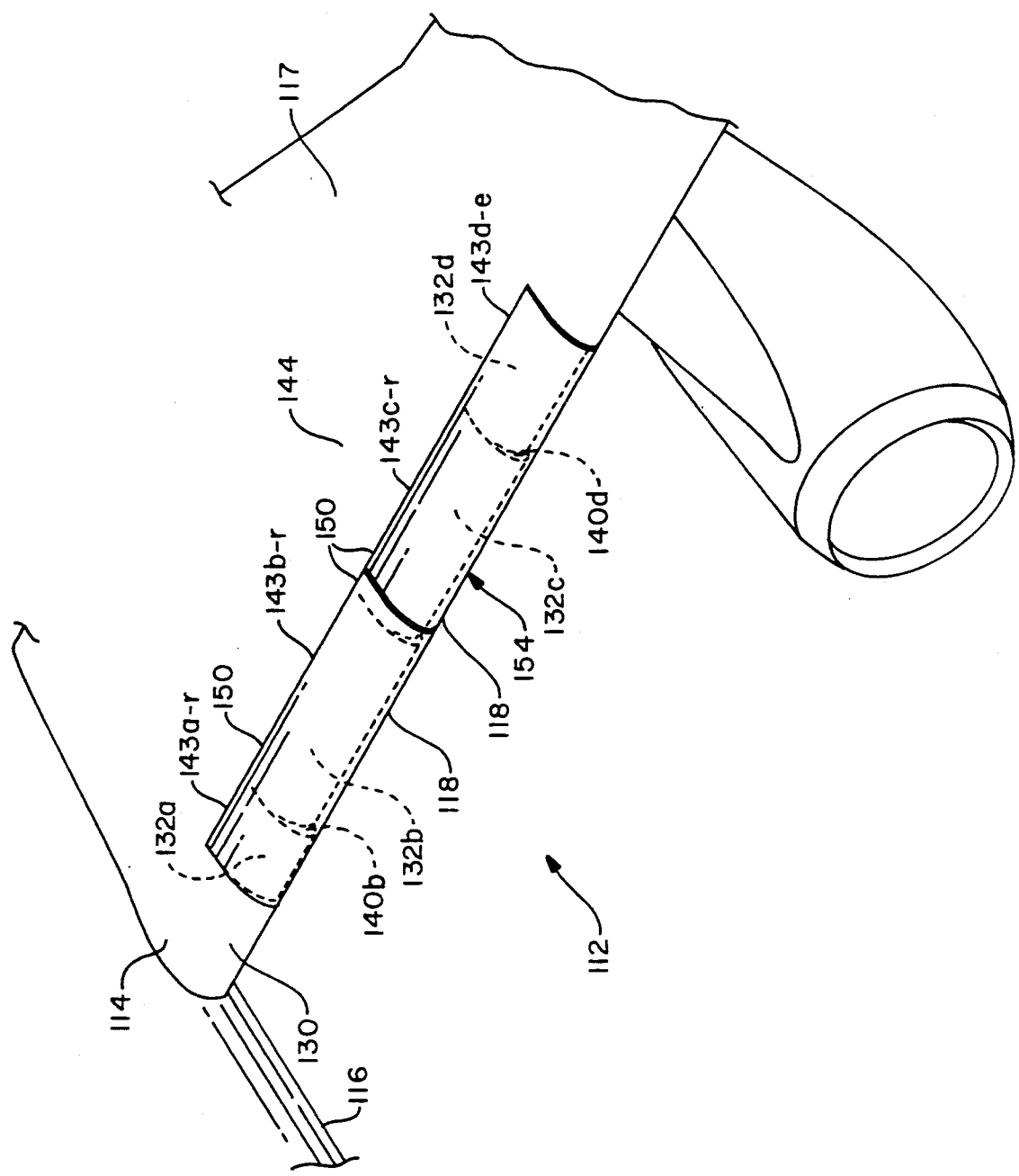

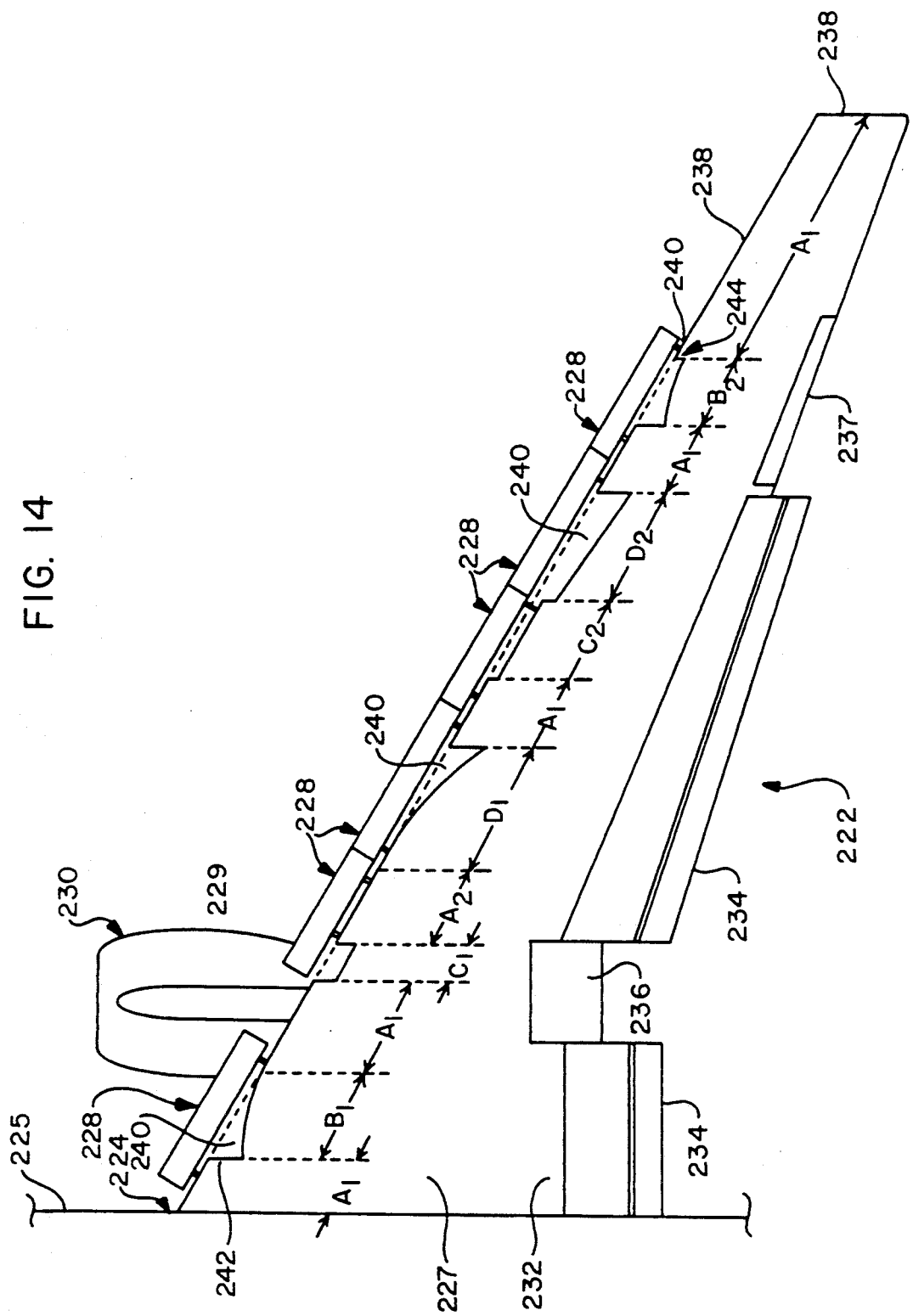

APPARATUS AND METHOD FOR AIRCRAFT WING STALL CONTROL

TECHNICAL FIELD OF THE INVENTION

This invention relates to a novel, improved apparatus and method to create air flow patterns across an airfoil which stabilize the location of the center of lift when stall conditions are encountered. In particular, the invention relates to a novel apparatus for swept wing aircraft which improves stall characteristics by minimizing forward migration of lift, thereby avoiding adverse nose-up pitching moment, with minimum loss of maximum lift capability.

BACKGROUND OF THE INVENTION

In the design of aircraft wings, one objective is to provide a wing that has the characteristic of a gradual stall progression. It is also desirable that adverse pitching moment characteristics be avoided so that a safe recovery can be easily made from a stall condition. These design criteria are particularly critical for swept wing aircraft with high lift devices, such as are used on modern high speed passenger airplanes.

In swept wing aircraft, the outboard wing sections are behind the center of lift of the aircraft, whereas the inboard portion of the wings are forward of the center of lift. One noticeable disadvantage of most swept wing aircraft is that during stall conditions, the outboard portion of the wing stalls prior to the inboard portion. Thus, as lift is lost on the outboard wing portions, the center of lift moves inward and forward. This forward movement of the center of lift results in the undesirable tendency for the aircraft nose to pitch up, thereby accelerating stall conditions on the remainder of the wing. Ultimately, as a stall condition develops on the remainder of the wing areas, lift is lost and the adverse pitching moment is eliminated. Then, under most conditions, the aircraft nose will fall downwardly and recovery from a stall can be performed.

Recovery from a stall having accompanying nose-up pitching moment is further aggravated in aircraft which employ horizontal stabilizers mounted on the top of a vertical stabilizer, i.e., "T-tail" configurations. At maximum angles of attack in such aircraft, the shed wake of the stalling wing and of any rear mounted engine nacelles flows rearward to envelop the tail assembly. This shed wake adversely affects the horizontal stabilizer effectiveness. The resulting reduction in tail effectiveness in combination with an inherent nose-up pitching moment in a stalling wing exacerbates recovery from a stall. Where a deep stall phenomenon is experienced, the aircraft can pitch nose-up upon stall and then drops more vertically at a relatively high angle of attack, in which case it may be more difficult for the pilot to bring the aircraft back to the desired angle of attack and with appropriate control of the aircraft.

Unlike the situation just described where adverse nose-up pitching moment is experienced, desirable stall characteristics in an aircraft wing are provided when a moderate nose down pitching moment, without roll, occurs when a wing experiences a stall condition. Generally, it is desirable that the onset of a stall condition occur with changes in lift patterns that avoid abrupt changes in pitching moments. In particular, it is desirable to eliminate the onset of an adverse nose-up pitching moment when loss of lift is experienced in swept wing aircraft.

One approach that has long been used by aircraft designers in an attempt to minimize the above-mentioned adverse nose-up pitching moment characteristics is the use of wing twist. That is, the inboard wing sections are provided with a greater angle of attack than the outboard wing sections. Theoretically, the inboard wing sections will therefore tend to experience boundary layer separation and thus see stall conditions earlier than the outboard wing sections which are positioned at a lower angle of attack with respect to the relative wind. However, in swept wing aircraft, a spanwise moving boundary layer, flowing from the inboard wing section toward the outboard wing section, tends to increase the boundary layer thickness on the outboard wing section. This phenomenon decreases the lifting capability of the outboard wing sections and makes them more prone to stalling than the inboard sections. Considerable attention has been directed toward devices which deal with improved control of boundary layer flows; those devices of which we are aware will be discussed herein below.

Other attempts to solve the problem of adverse nose-up pitching moment during stall have included: (a) the application of leading edge fences, (b) the use of slot-gap cover plates, and (c) the use of stall strips at various locations.

Leading edge fences have proven somewhat effective in controlling adverse post-stall characteristics, and are currently employed on numerous swept wing aircraft. The devices have been most extensively utilized on swept wing aircraft having aft-body mounted engines and "T-tails". The leading edge fences are most effective for aircraft cruise configurations; they are not particularly effective for takeoff or landing. Another disadvantage of the leading edge fence devices is that they increase drag during cruise.

Use of slot-gap cover plate has also been suggested as a way to improve pitching characteristics at stall during high angles of attack. Such a plate seals the space between a main wing section and a leading edge device, and typically would be employed on inboard wing sections. One aerodynamic disadvantage of such a device is the large wake that such a device sheds, with a corresponding loss in tail effectiveness for "T-tail" aircraft. Thus, the hazard of a "deep stall" phenomenon, as mentioned above, may be encountered. Also, a significant loss of maximum lift capability results when this device is used. Another disadvantage is the apparent need to make the cover plate movable either in conjunction with deployment of the leading edge device, or as a separately controlled device.

Stall strips are used on many types of aircraft to control the stall pattern and/or stall progression. Stall strips can be located in either an exposed position, such as on a wing leading edge near the wing root, or in a concealed position, such as on a main wing section that is concealed during cruise by a movable leading edge device. When stall strips are located in concealed positions, they do not impose a drag penalty during cruise. However, stall strips have several undesirable features, including:

(a) significant loss in maximum coefficient of lift, and (b) creation of a large wake locally along the wing span. The latter item is particularly undesirable, since an increased shed wake adversely affects "T-tail" performance, with the result that improved stability associated with localized inboard lift loss is offset by a corresponding loss of control effectiveness.

A search of the patent literature has disclosed a number of patents which have, in part, attempted to solve the aforementioned problems of stall stability in swept wing aircraft, as follows:

U.S. Pat. No. 2,041,793, issued May 26, 1936 to Stalker, discloses slotted wings which include vortex generating devices in the slots which energize the air and increase lift from air passing through the slot. The vortex generating vanes also serve to mix the boundary layer air, to decrease boundary layer drag.

U.S. Pat. No. 2,070,006, issued Feb. 9, 1937 to Eaton, Jr. et al., discloses a spoiler system for use in aircraft having leading edge slats. The spoilers are located at the forward portion of the fixed wing section, so that spoilers are hidden and therefore inoperative when the slats are not deployed.

U.S. Pat. No. 2,743,888, issued May 1, 1956 to Lippisch, shows a swept wing aircraft with pivoting winglets along each of the leading edges. The winglets are pivoted outwardly and forwardly at low speed to create a series of discontinuities along the wing leading edge, to reduce drag and to increase lift.

U.S. Pat. No. 2,769,602, issued Nov. 6, 1956 to Furlong, shows a chord extension device which is adapted to fit smoothly along the leading portion of a swept wing to increase the chord along a segment of such wings. Also, Furlong discloses that the chord extensions provide discontinuities along the leading edge which determine the location of initial boundary layer separation, thus providing acceptable stability variations throughout the entire lift range.

U.S. Pat. No. 2,793,826, issued May 28, 1957 to Fiedler, shows the use of a split wing to overcome low speed wing tip stall on a swept wing aircraft. The Fiedler invention utilizes a matching wing pair, wherein one section is rigidly mounted in a standard sweptback configuration, and a second portion is hinged at the wing root and extends forward and outward for improved low speed stability.

U.S. Pat. No. 3,370,810, issued Feb. 27, 1968 to Shevell et al., illustrates the use of an underwing aerodynamic body to create a vortex which sweeps across the upper wing surface in a direction opposite to the boundary layer flow toward the wing tip. Shevell discloses that a vortex thus created is of relatively high strength and adequate to prevent wing tip stall.

U.S. Pat. No. 3,523,661, issued Aug. 11, 1970 to Rethorst, illustrates use of a series of asymmetric underwing diffusers to reduce spanwise air flow and recover energy therefrom.

U.S. Pat. No. 3,638,886, issued Feb. 1, 1972 to Zimmer, illustrates a leading edge slotted flap configuration which extends to reveal a uniformly sized fixed main wing portion.

U.S. Pat. No. 4,032,087, issued June 28, 1977 to Cleaves, discloses a leading edge spoiler system, and includes a series of air vents/spoiler bearing supports.

U.S. Pat. No. 4,293,110, issued Oct. 6, 1981 to Middleton et al., illustrates a series of leading edge vortex flaps for use on highly swept back aircraft. In an extended position, each of the flaps forms a discontinuous outboard end which is useful in vortex shedding to reduce spanwise airflow. When stowed for cruise, the flaps form a continuous smooth leading edge.

U.S. Pat. No. 4,323,209, issued Apr. 6, 1982 to Thompson, illustrates the use of a series of forwardly projecting fingers to shed a vortices rearward across an airfoil.

U.S. Pat. No. 4,378,922, issued Apr. 5, 1983 to Pierce, illustrates use of fuselage strakes in a low aspect ratio aircraft. These strakes, however, are directed at improving lateral stability at high angles of attack, rather than for changing aircraft stall characteristics.

U.S. Pat. No. 4,553,721, issued Nov. 19, 1985 to Jorgensen, discloses a spoiler device for use on an aircraft having a leading edge slat. The spoiler is designed to increase drag and reduce lift on the inboard portions of swept wings, so as to prevent a forward migration of the center of lift, with resultant adverse nose-up pitching moment.

Finally, prior U.S. Pat. No. 4,702,441, issued Oct. 27, 1987 to Wang, discloses use of stall strips of either rigid or spring mounted construction. The stall strips are exposed when the slats are deployed. They produce an air flow disturbance between a fixed main wing section and an extensible leading edge slat, to promote stall formation over the inboard wing portion.

SUMMARY OF THE INVENTION

In contrast to the various devices that have heretofore been utilized in an attempt to avoid adverse nose-up pitching moment upon approach of a stall condition, the novel stall control apparatus and method disclosed herein provides one or more types of variable contoured surfaces which are configured to modify the localized aerodynamic pressure over a portion of a fixed main wing surface. The contoured surfaces are aerodynamically concealed by movable leading edge devices during aircraft cruise. When the movable leading edge devices are deployed, the contoured surfaces are aerodynamically exposed, and act to locally modify airflow over the airfoil so as to induce a localized portion of the airfoil to stall at a desired angle of attack.

The contoured surface may include one of more of the following: (a) variable bluntness of fixed main wing leading edge portions, (b) the technique of varying the slot-gap width between a fixed main airfoil and a movable leading edge device, and (c) a passive vortex shedding fence. Furthermore, the apparatus and methods disclosed herein achieve the desired moderate pitching moment characteristics with minimal additional lift loss during stall without increasing drag during aircraft cruise conditions.

The present invention comprises an airfoil section having a tip end, a root end, and an upper surface and lower surface therebetween, with an airflow path above the upper surface and below the lower surface. The airfoil has adjustably attached thereto one or more leading edge members, which are movable between a cruise position wherein at least a portion of the fixed leading edge of the main wing is aerodynamically concealed, and a deployed, high lift position where the said fixed leading edge portion that was aerodynamically concealed at cruise is now aerodynamically exposed. Thus, a gap is formed between the leading edge member and the fixed leading edge of the main wing. The now exposed fixed leading edge portion has an aerodynamically smooth contoured gap forming surface which is provided with a selected nose bluntness. The nose bluntness selected for a first and for a second spanwise section of the fixed leading edge gap forming portion of the wing are varied so that stall characteristics and progression, (with respect to angle of attack) are matched between a first, outboard section and a second, inboard wing section. When such variable bluntness is employed, at least a portion of the gap forming smooth surface contoured portion in the second, inboard wing section is spaced further from the leading edge member than if such smooth, continuous surface contoured portion were provided so as to optimize airflow through the gap with respect to lift and drag.

Another configuration element for accomplishing the desired aerodynamic characteristics, which may be employed in conjunction with the above, consists of interposing at least one chord length discontinuity on the fixed leading edge between the wing root and the wing tip, so as to modify airflow over the now exposed contoured surface portion of the fixed leading edge. These discontinuities may take the form of one or more leading edge fences which are concealed at cruise, but exposed when the leading edge members are deployed.

OBJECTS, FEATURES, AND ADVANTAGES OF THE INVENTION

It is an object of the present invention to provide a wing design whereby adverse nose-up pitching moment associated with wing stall is minimized or eliminated while maximizing the lifting capability of the wing.

It is also an object of the present invention to provide a wing stall control apparatus which is simple and therefore inexpensive to manufacture.

It is an important object of the present invention to provide a wing stall control apparatus which matches lift losses on the inboard and outboard wing sections at varying angles of attack, so as to minimize forward movement of the center of lift and the associated adverse nose-up pitching moment.

It is an important and primary feature of the present invention that the need for additional actuation devices or controls are completely eliminated.

It is another important and primary feature of the present invention that there is no drag penalty incurred during aircraft cruise.

It is an important feature of our invention that no additional moving parts are required. This is a distinct advantage and improvement when compared to many conventional systems identified above.

It is an advantage of the present invention that the apparatus may be quickly and easily installed within the confines existing aircraft wing designs.

It is yet another important advantage of our invention that the device reduces the need for complex electronic flight envelope control systems designed to assure automatic protection against adverse nose pitch up regardless of pilot input.

Additional objects, advantages, and novel features of our invention will be set forth in the DETAILED DESCRIPTION OF THE INVENTION which follows, or may become apparent to the reader from the appended claims and accompanying diagrams, or may be learned by practice of the invention. The objects and advantages of the invention may be realized and attained by means of the instrumentalities and combinations particularly pointed out in the appended claims.

BRIEF DESCRIPTION OF THE DRAWINGS

Our invention may be more clearly understood by reference to the accompanying drawings thereof, wherein:

FIG. 11 is another view of the present invention first illustrated in FIG. 8, showing in this FIG. 11 the present wing stall control apparatus in an unexposed, cruise configuration, where the leading edge slats are completely retracted.

FIG. 14 is a plan view of a swept wing of an aircraft illustrating a number of embodiments of the present invention which may be utilized to provide a wing with desirable pitch characteristics.

DETAILED DESCRIPTION OF THE INVENTION

Figure 1:
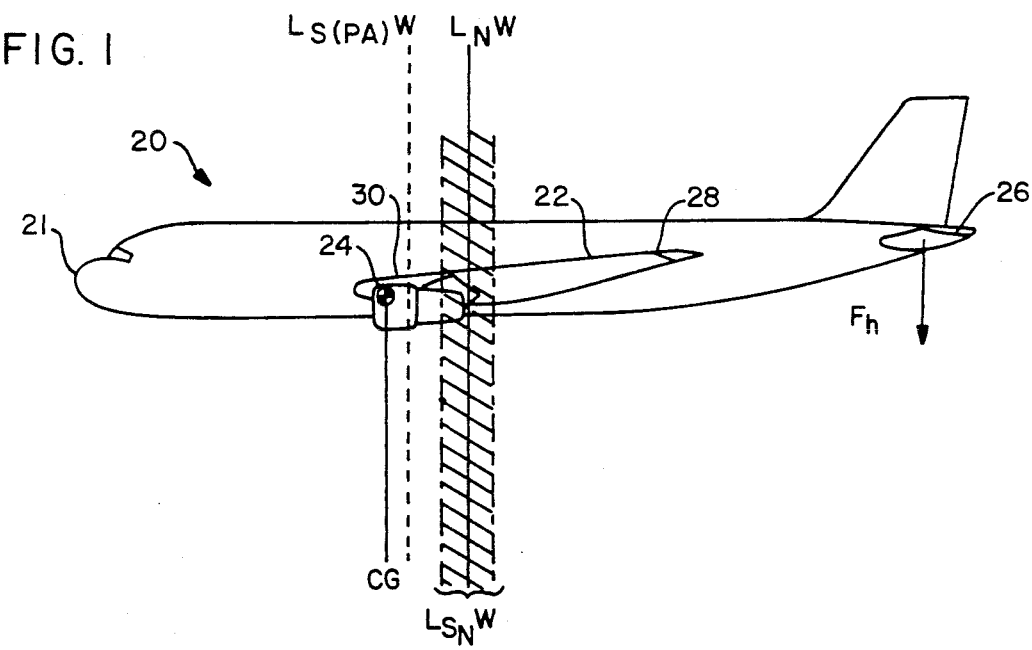
FIG. 1 is a side view of a modern swept wing aircraft where the stall control device according to our invention may be utilized.

FIG. 1 illustrates an aircraft 20 of conventional, subsonic commercial passenger or cargo type, which has a nose 21 and rearwardly swept wings 22. In such aircraft, the normal pitch axis extends through the center of gravity (CG) 24 of the aircraft, which is generally located about 25% of chord length rearward from the front of the mean aerodynamic wing chord. The normal center of lift, $L_nW$ of the swept back wing is located rearward of the pitch axis. To prevent a nose-down condition during normal operation, a downwardly acting force $F_h$ is provided by the rear mounted horizontal stabilizers 26.

At low aircraft speeds, or at high angles of attack, or during other unusual maneuvers, the wings 22 of aircraft 20 may experience a stall condition. As will be discussed further herein below, during such stall conditions, it has been a common problem in swept wing aircraft for the outboard portion 28 of wing 22 to stall before the inboard portion 30.

Since the outboard wing portions 28 are rearward of the inboard portions 30, when the outboard wing portions 28 stall, the center of lift LW for the wing 22 moves forward to a location, $L_{s(pa)}W$ (prior art wing stall center of lift) until a full stall condition is reached. The forward longitudinal movement of the center of lift LW of wing 22 results in a nose-up pitching moment about the pitch axis 24.

The above described nose-up pitch characteristics are exactly the opposite of a desirable stall profile in a wing. Rather, it would be desirable for stall conditions in wing 22 to be controlled so that there is a minimum of adverse nose-up pitching moment as stall increases. In an optimum design, stall conditions would result in gentle nose-down pitching moment, without roll, while maintaining yaw control. The present invention provides a new technique which may be used by aircraft designers for minimizing or eliminating the occurrence of an adverse nose-up pitching moment during the progression of wing stall conditions.

By design of forward aerodynamic surfaces of wing 22 in accord with our invention, and in particular by design of the fixed forward surfaces of the main wing structure (illustrated in FIG. 8) which become aerodynamically exposed when a movable leading edge member (illustrated in FIG. 8) is deployed, an improved location for the center of lift of the wing $Ls_nW$ (new wing stall center of lift) can be provided by the aircraft designer. This new center of lift $Ls_nW$ as provided by our invention may be located anywhere within a more desirable rearward region in a swept wing aircraft 20, so as to provide improved stall characteristics which minimize or eliminate undesired nose-up pitching moment.

Figure 2:
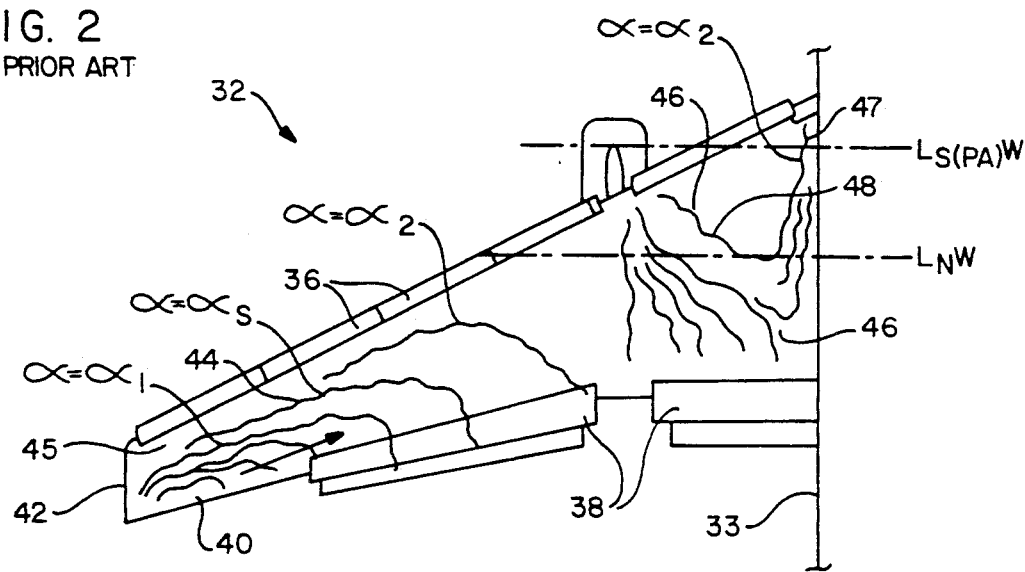
FIG. 2 is a top plan view of a swept wing in an aircraft, illustrating the pattern of growth of wing stall with increasing angle of attack, showing both the outboard and inboard wing stall areas.

FIG. 2 illustrates a typical prior art swept wing 32, attached to the side of the fuselage 33 of an aircraft 34 (not shown). Wing 32 has a set of leading edge slats or flaps 36, and a set of trailing edge flaps 38, both of which are shown in their outwardly deployed, high lift positions, as may be utilized during takeoffs or landings.

Figure 3A:
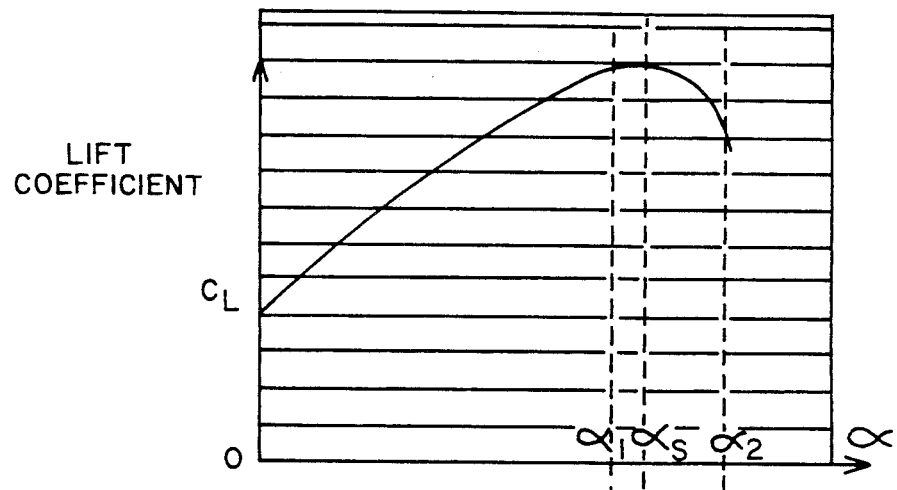
FIG. 3(a) and 3(b) are graphs plotting lift and pitching moment, respectively, against the angle of attack of a swept wing.

It is during such low speed maneuvers as takeoff or landing that the stall characteristics of wing 32 become critically important. To illustrate the stall characteristics of a typical prior art swept wing 32, reference is made to the graphs shown in FIGS. 3(a) and 3(b). In FIG. 3(a), the change in coefficient of lift of a swept wing 32 is illustrated as a function of an increasing angle of attack Alpha ($\alpha$). For most airfoils, the coefficient of lift increases relatively uniformly until it reaches an angle of attack Alpha ($\alpha$)1. Thereafter, the rate of increase in lift coefficient diminishes between Alpha ($\alpha$)1 and an Alpha ($\alpha$)S, the angle of attack at which initial stall occurs. In increasing angle of attack between Alpha ($\alpha$)S and an Alpha ($\alpha$)2, the airfoil stalls more severely, and the lift coefficient therefore decreases.

Figure 3B:
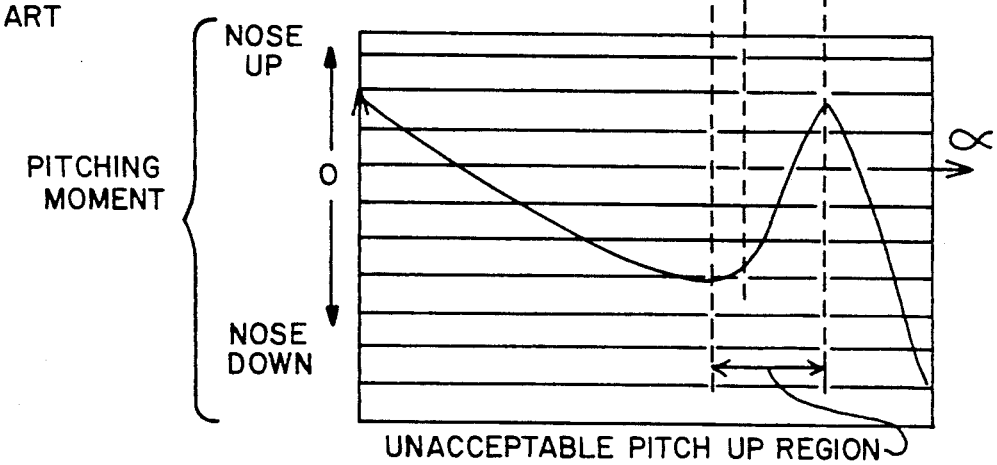

Turning now to FIG. 3(b), it can be seen that as the angle of attack increases to point Alpha ($\alpha$)1, the pitching moment experienced by the aircraft is negative, i.e., the nose of the aircraft tends to pitch slightly downward. Therefore, the aircraft is considered stable in pitch. However, between angle of attack Alpha ($\alpha$)1 and angle of attack Alpha ($\alpha$)2, the pitching moment becomes more nose-up as the angle of attack Alpha ($\alpha$) is increased. This phenomena is evidence of an inherently unstable condition in the aircraft, as the aircraft has an inherent tendency to stall once Alpha ($\alpha$)1 is exceeded.

Returning now to FIG. 2, the stall patterns experienced in wing 32 at varying angles of attack Alpha ($\alpha$) are illustrated. The patterns are identified for stall which occurs in regions at an Alpha ($\alpha$)1, Alpha ($\alpha$)S, and Alpha ($\alpha$)2 as indicated in the graphs of FIG. 3(a) and 3(b). As the angle of attack in a swept wing aircraft increases, an outboard stall occurs at location 40, that is at the trailing upper edge surface of the wing 32 near the wing tip 42 of wing 32. As the angle of attack of Alpha ($\alpha$) increases, the area of stall on the wing 32 increases, and moves a moderate amount forward and inboard. This is shown as the initial stall area at 40 grows to a larger region indicated at angle of attack Alpha ($\alpha$)1, and a still larger region identified at 44, which occurs at angle of attack Alpha ($\alpha$)S. As the outboard area of the wing experiences a stall condition that grows from location 40 to location 44, the amount of lift contributed by the outboard wing portion 45 is reduced. Any further increase in angle of attack Alpha ($\alpha$) sharply reduces lift contributed by the outboard wing portion 45.

In the prior art swept wing 32 illustrated in FIG. 2, a stall condition on the inboard wing portion 46 is experienced once the angle of attack Alpha ($\alpha$) reaches Alpha ($\alpha$)2, indicated at 47. And as the angle of attack Alpha ($\alpha$) increases still further, the inboard stall region grows toward the area indicated at 48. The obvious disadvantage of the stall patterns experienced on wing 32 is that lower angles of attack up to Alpha ($\alpha$)2, little or no stall is experienced on the inboard wing portion 46, while a significant stall is experienced on the outboard wing portion 45. Lift is first lost on the outboard wing portion 45, and since the inboard wing portion 46 continues to provide lift, the center of lift $L_nW$ will move forward to a new center of lift $L_{s(pa)}W$. As a result, the aircraft will experience a severe nose-up pitching moment, as illustrated in the graph of FIG. 3(b). Such nose-up pitch characteristics as an aircraft experiences increasing stall conditions are obviously undesirable. This nose-up pitching characteristic tends to increase the angle of attack Alpha ($\alpha$) when a partial stall condition is experienced, to bring the wing 32 closer to a full stall condition. Thus, an abrupt nose pitch-up condition degrades the ability to control the airplane.

Figure 4:
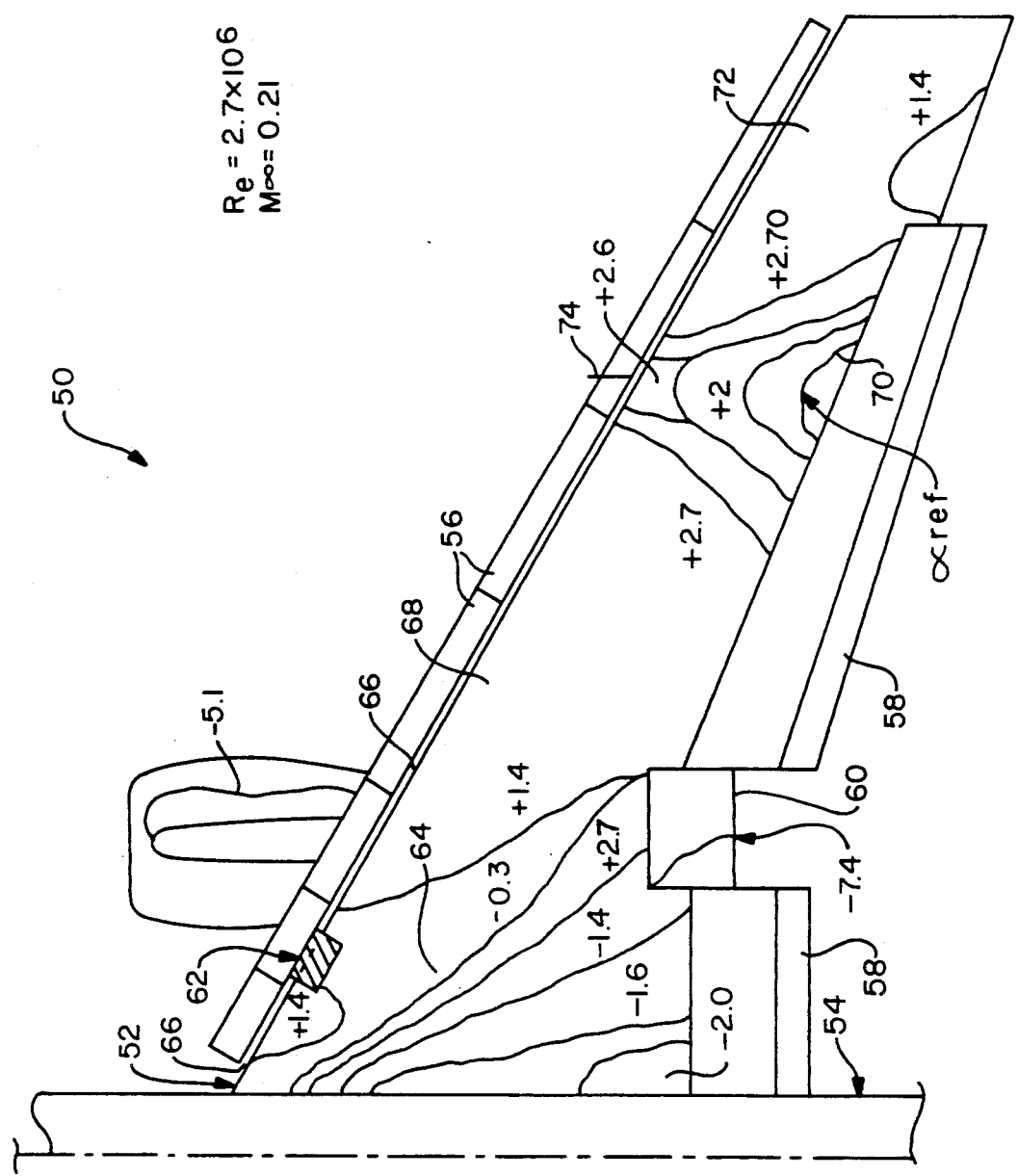
FIG. 4 is a top plan view of a swept wing in an aircraft, illustrating the pattern of growth of wing stall as seen when prior art devices, a slot gap closing plate, and a slat fence, respectively, are utilized.

One approach which has been tried to alleviate the problem just discussed is illustrated in FIG. 4. Here, a swept wing 50 is illustrated operating in a high lift configuration at 0.21 Mach with a Reynolds number of $2.7 \times 10^6$. The wing is attached at the wing root 52 to the side of the fuselage 54 of an aircraft. The wing 50 is equipped with leading edge slats or flaps 56, and trailing edge flaps 58, both of which are shown in their high lift, deployed condition. An inboard aileron 60 is depicted between segments of the trailing edge flaps 58. A slot-gap closing or cover plate 62 is shown located on the inboard portion 64 of wing 50. The slot-gap cover plate 62 blocks the airflow upward through the slot 66 which occurs between slat 56 and main wing structure 68. Thus, the slot-gap cover plate 62 reduces the cross-sectional area available for airflow upward through slot 66 and causes wing 50 to loose lift locally along the inboard portion 64.

The improvement provided by the slot-gap cover plate can be appreciated by referring to the stall patterns shown for wing 50 at varying angles of attack Alpha ($\alpha$) compared to an a stall pattern experienced at a reference angle of attack Alpha ($\alpha$) Ref. indicated at 70. It can be seen that with the slot-gap closing plate 62, significant area of the inboard wing portion 64 experiences a stall, for example, at angles of attack Alpha ($\alpha$) of 1.6°, 1.4°, and 0.3° less than when a stall develops on the outboard wing 72 at an angle of attack Alpha ($\alpha$) Ref. at location 70. Thus, this approach to the problem of adverse nose-up pitching moment at stall induces the inboard wing portion 64 to stall at angles of attack less than angles of attack necessary to create a stall condition on the outboard wing portion 72. Thus, the earlier lift loss on the outer wing portion 72 as illustrated above in FIG. 2 is not experienced. Therefore, the center of lift LW for the wing 50 is not dislocated significantly forward.

The wing 50 illustrated in FIG. 4 also shows use of a slat fence 74, which prevents boundary layer air from flowing spanwise across the wing. Stall occurs at higher angles of attack, as can be seen from the illustrated stall patterns. Thus, the slat fence 74 helps delay the onset of stall at the outboard wing portion 72.

However, the devices illustrated in FIG. 4 have several disadvantages. The major aerodynamic disadvantage of the slot-gap closing plate 62 is that the device sheds a large wake which flows rearward, with a corresponding loss in effectiveness of the tail of the aircraft, especially for "T-tail" aircraft configurations. The slot-gap closing plate 62 also causes the wing 50 to loose lift locally, i.e., the maximum lift coefficient is decreased. An additional disadvantage is the apparent need to make the slot-gap cover plate 62 movable, either in conjunction with the slats 56 or as a separately controlled device.

The slat fence 74 shown is always exposed, thus imposing an additional drag penalty at cruise. Also, since the fence 74 is located on the movable leading edge device or slat 56, the fence 74 may be less effective during high lift conditions that would be desirable.

Figure 5:
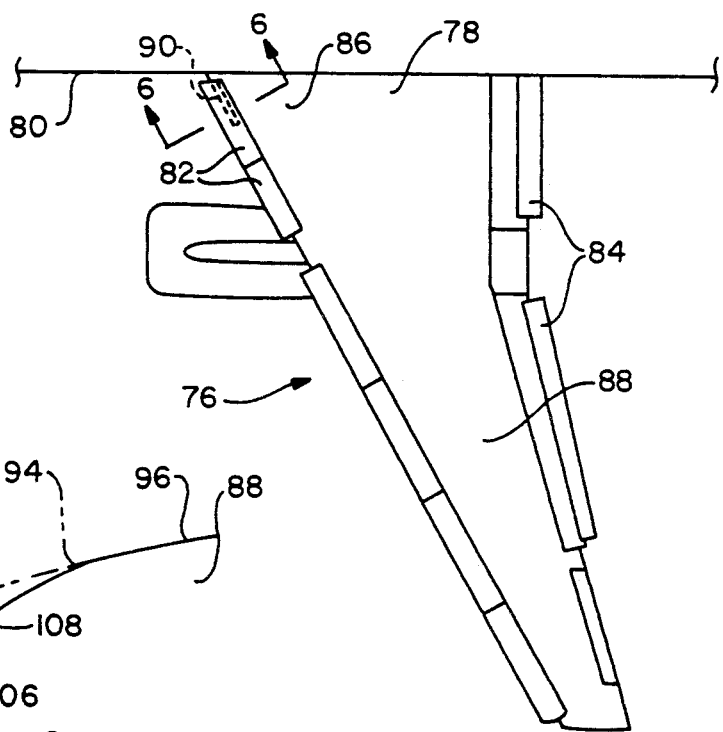
FIG. 5 is a top plan view of a swept wing in an aircraft, showing the location of certain prior art devices which are illustrated below in FIGS. 6 and 7.
Figure 6:
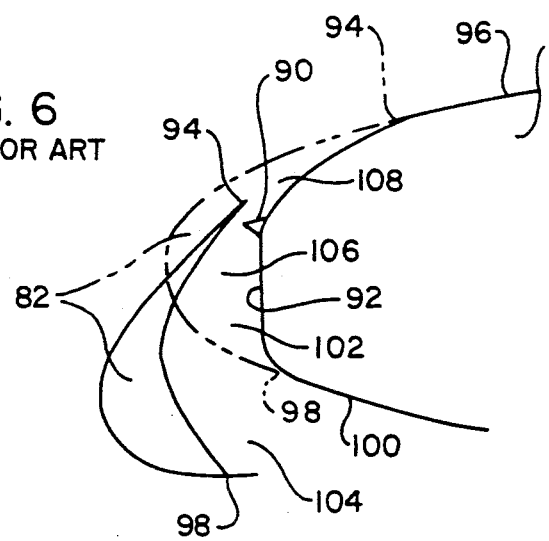
FIG. 6 is a sectional view further illustrating a prior art stall strip device, taken through line 6—6 of FIG. 5.
Figure 7:
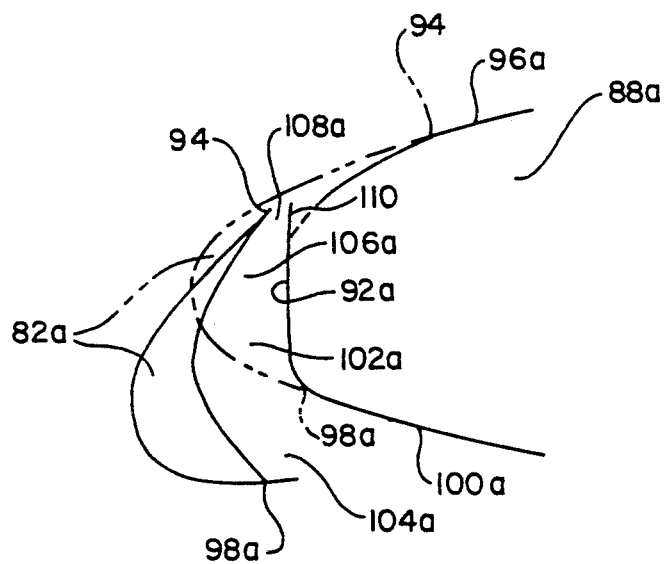
FIG. 7 is a sectional view, similar to the view of FIG. 6, further illustrating a prior art movable stall strip device.

FIGS. 5, 6, and 7 illustrate other prior art devices which were first described in U.S. Pat. No. 4,702,441, issued to Wang. In FIG. 5, a swept wing 76 is shown attached at the wing root 78 to the side of an aircraft fuselage 80. The wing is shown with movable leading edge slats or flaps 82, and trailing edge flaps 84. At the inboard wing portion 86 of main wing structure 88, a stall control device 90 is shown in broken lines.

FIG. 6 shows a sectional view of a prior art stall control device 90 first identified in FIG. 5 above. A stall control device or stall strip 90 is permanently attached to a forward surface 92 of a main wing structure 88. The leading edge slat 82 has an upper rear edge portion 94 which when in the cruise, non-deployed position, (shown in broken lines) blends into the aerodynamic contour of the upper aerodynamic surface 96 of main wing structure 88. The slat 82 also has a lower rear edge portion 98, which in the cruise configuration, retracted condition, blends aerodynamically into the lower aerodynamic surface 100 of main wing structure 88. Thus, in the cruise, high speed condition, the slat 82 covers the forward surface portion 92 of the main wing structure 88, and in so doing, also covers the stall control device 90. For low speed, high lift, operation, slat 82 is moved downwardly and forwardly to a deployed position (shown in solid lines) where it forms a gap with the forward wing surface portion 92 a slot 102 which has a lower entry portion 104, an upwardly convergent central portion 106, and a narrow upper throat portion 108, from which air flowing through the slot 102 exits and then passes over the upper aerodynamic surface 96. The add-on stall strip 90 increases pressure drop through the slot 102, thereby locally modifying airflow over the upper aerodynamic surface 96. When device 90 is utilized at the inboard wing portion 86, inboard stall may be achieved at reduced angles of attack Alpha ($\alpha$).

FIG. 7 illustrates another prior art device similar to that shown in FIG. 6, however, the device illustrated in FIG. 7 is a movable stall strip 110. Components which are similar to the prior art device shown in FIG. 6 are given like numerical designations with an "a" suffix distinguishing those of the embodiment shown in FIG. 7. In FIG. 7, a movable stall strip 110 is normally urged by a tension spring (not shown) toward a closed position where it lies flush against the forward surface portion 92(a) of the main wing 88(a). However, with high velocity air flow through slot 102(a), the pressure reduction results in the forward movement of the stall strip 110.

One negative feature associated with the various stall control strips which are known to us, including those just illustrated in FIGS. 6 and 7, are that they result in significant loss in the maximum delivered lift coefficient. Also, they increase the magnitude of the shed wake locally, which is particularly undesirable along the inboard span of the wing. Therefore, similar to problems inherent with use of the slot-gap cover plate device 62 mentioned above, the effectiveness of rear mounted aerodynamic control surfaces is decreased. This is especially true on aircraft with "T-tail" configurations, where the shed wake adversely impacts the ability accomplish aircraft attitude control inputs with the tail control surfaces, which in an extreme situation might result in an unrecoverable "deep stall" situation.

It is with the foregoing considerations in mind that the present invention was created.

Generally, for a wing with a slotted leading edge slat, there is an optimum position, in terms of slat deflection angle, slot-gap, and slat heighth, relative to the nose of the fixed main wing surface, that will yeild the maximum local lift coefficient. When the slot-gap, i.e., the gap between the nose of the fixed main wing and the leading edge slat, is larger than that which would be provided to achieve a maximum lift coefficient, the air flow upward over the nose and then rearward over the upper aerodynamic surface of the fixed main wing will tend to separate earlier, i.e., at lower angles of attack. The present invention exploits the characteristics of slot-wing interaction, and, using various means discussed herein, tailors an aerodynamic pressure profile along the span of a wing in order to achieve a stall pattern relative to increasing angle of attack which minimizes the longitudinal, forward-rearward movement of the center of lift of the wing to thereby alleviate undesired nose-up pitching moment.

The present invention involves contouring the nose portion of the leading edge portion of the main wing structure to achieve the desired stall characteristics. This contouring may involve one or more of the following components: (1) bluntness of the nose portion of the fixed main wing structure is varied; (2) slot-gap width is varied; (3) a step change in chord length is provided. While these factors may be used in combination, as illustrated in the accompanying figures, it must also be recognized that these components of contouring the leading edge of a main wing section may be used individually. For instance, a spanwise slot-gap width variance might be achieved while maintaining a constant nose bluntness, by changing the attachment configuration between the leading edge device and the fixed main wing. Also, the bluntness of the nose could be changed, yet a step change in chord length could be omitted. However, the desired result, i.e., elimination of adverse nose-up pitching moment, is believed to be best achieved by utilizing a combination of those factors identified above, wherein the shape of the nose of a main wing section is varied locally to modify stall initiation and progression characteristics relative to angle of attack. Thus, this invention exploits the interactive aerodynamic characteristics of a configuration between a main wing and a movable leading edge member, to provide an aircraft which avoids adverse nose-up pitching moment.

FIGS. 8 through 12 illustrate the apparatus and method of the present invention.

Figure 8:
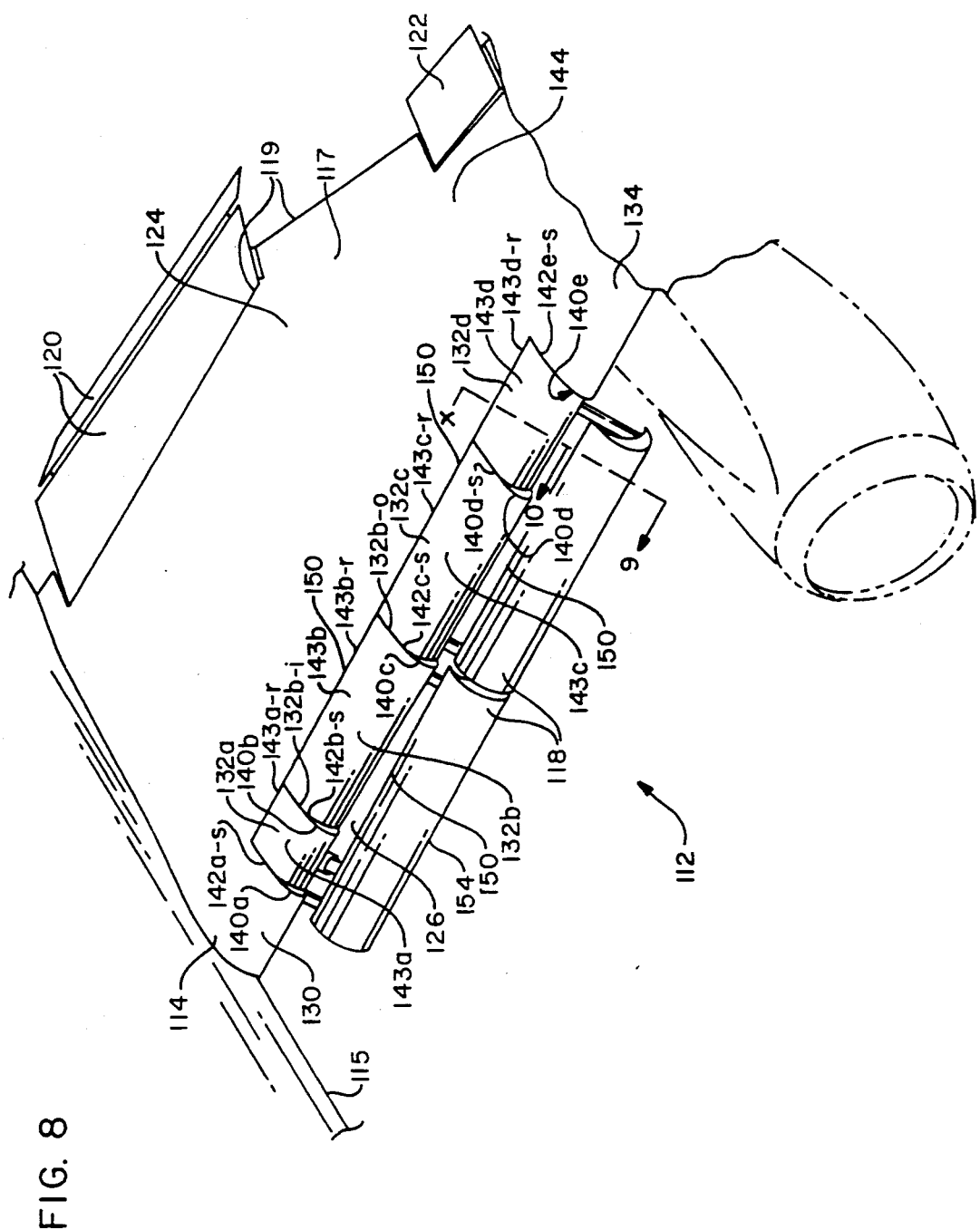
FIG. 8 is a perspective view of an inboard wing section illustrating the present invention.

There is shown in FIG. 8 a swept wing airfoil 112 which is attached at the wing root 114 to the side of a fuselage 115 of an aircraft 116 (not shown). Most of wing 112 is comprised of a fixed main wing structure 117. Attached to wing structure 117 are movable leading edge members, slats 118, here shown in their deployed high lift position. Also shown attached to the trailing edge portion 119 of the main wing structure 117 are trailing edge flaps 120, and an inboard aileron 122.

Between the inboard wing portion 124 of main wing structure 117 and the slats 118 there is formed a slot-gap 126. This slot-gap 126 is important since the present invention provides a novel method and apparatus for varying, spanwise, the width, cross-sectional area, and thus the resultant airflow through slot-gap 126 to thereby create stall characteristics in wing 112 which improve aircraft pitch stability.

Spanwise across the main wing structure 112, starting from the root 114, there are illustrated six (6) different leading edge nose portions of fixed main wing structure 117, which have various contours, or bluntness. For convenience, these leading edge portions of wing 117 are identified, in order, as inboard section 130, contoured surface regions 132(a), 132(b), 132(c), and 132(d), and a main wing leading edge portion 134. The contoured surface regions 132(a) through 132(d) therefore are the gap-forming surfaces which determine, in part, the localized dimensions of slot-gap 126. It can be seen that the outboard ends of the contoured surface regions, e.g., end 132(b-o) of surface 132(b), are situated so as to provide a narrower slot-gap 126 (in the direction of airflow) at the portion of slot 126 adjacent to the outboard ends of the contoured surface regions, when compared to the slot-gap 126 width adjacent to the inboard ends, e.g., end 132(b-i).

By the use of a number of offset contoured surface regions, as here illustrated by use of contoured surface regions 132(a) through 132(d), a series of leading edge fences 140(a) through 140(e) are also created. It can be appreciated that at the leading edge fence locations 140(a) through 140(e), there is an instantaneous step change in the chord length of main wing structure 117.

At each of the leading edge fences 140(a) through 140(e), there is a side blend point 142(a-s) through 142(e-s) where the upper surface location 143(a) through 143(d) of the respective contoured surface regions match the contour of the adjacent contoured surface region. A similar rear blend point 143(a-r) through 143(d-r) exists where the contoured surface regions meet the cruise portion of the upper aerodynamic surface 144 of main wing structure 117. A similar situation exists on the lower aerodynamic surface 145 (shown in FIG. 9) of wing 112. Spanwise variance of the location of fences 140(a) through 140(e), and longitudinal (forward-rearward) variance in the location of side blend points 142(a-s) through 142(e-s) and of rear blend points 143(a-r) through 143(d-r), will locally change the stall characteristics of wing 112.

By making suitable adjustments to the localized stalling characteristics of the inboard portion 124 of wing 112, a stall pattern can be achieved on the inboard portion 124 which matches, at increasing angles of attack, the stall pattern experienced on an outboard portion (shown, for example, in FIG. 12) of wing 112. Thus, the amount of lift on wing 112, and the locations at which that lift is provided by the outboard and inboard portions, is matched to roughly balance resulting pitching moment. As a result, the center of lift LW of wing 112 can be controlled to a narrow region, even as angle of attack changes. Thus, the adverse nose-up pitching moment experienced in prior art aircraft can be avoided. Rather, the center of lift as provided by our new invention can be limited to a desired region, such as identified as $L_{sn}W$ in FIG. 1.

Figure 9:
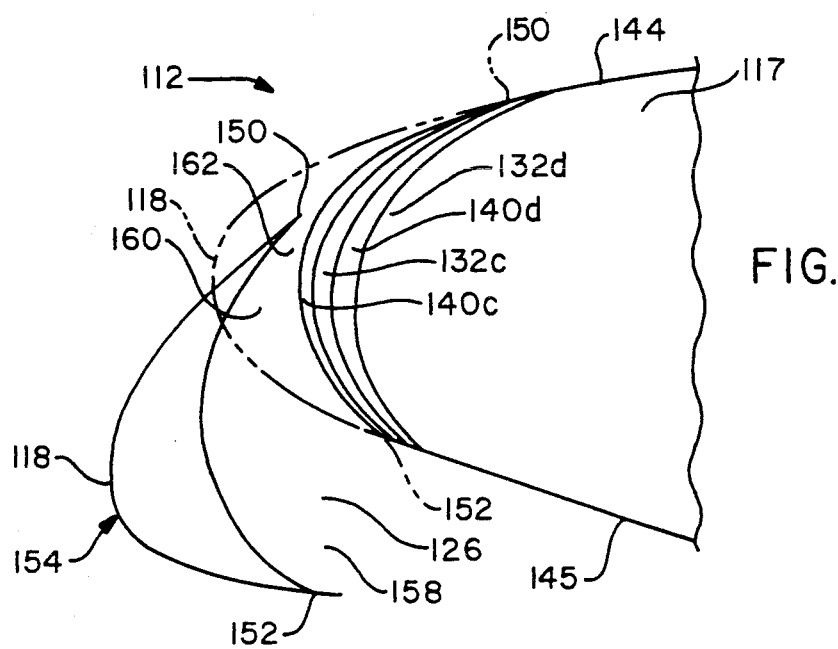
FIG. 9 is a partial cross-sectional view of main wing surfaces, showing a series of abrupt chord changes provided in a wing section in an embodiment of the present invention, taken through the line X-9 of FIG. 8.

Turning now to FIG. 9, a partial cross-sectional view of our method of wing construction first illustrated in FIG. 8 is shown. Fixed main wing structure 117 has an upper aerodynamic surface 144, and a lower aerodynamic surface 145. A movable leading edge member, slat 118, is shown, in full lines, in its deployed, high lift position. A cruise, stowed position for slat 118 is shown in broken lines. The slat 118 has an upper rear edge portion 150 which, in the cruise position, blends into the aerodynamic contour of the upper aerodynamic surface 144. Slat 118 also has a lower rear edge portion 152 which, in the cruise position, blends aerodynamically into the lower aerodynamic surface 145. Thus, when in the cruise position, the forward surface 154 of slat 118 becomes the leading edge surface of wing 112.

When slat 118 is in its forwardly and downwardly deployed high lift postion, there is a slot 126 formed between the slat 118 and main wing structure 117. Slot 126 has a lower entry portion 158, an upwardly convergent central portion 160, and a relatively narrow upper throat portion 162 through which the air flowing through the slot 126 passes before flowing rearwardly over the upper aerodynamic surface 144 of the main wing structure 117.

The contoured regions provided by the present invention are evident in several ways in this FIG. 9. First, it can be seen that the forward outer end portions or leading edge fences 140(d) and 140(c), present abrupt step changes in the width of slot 126. Less obvious, but also evident in this drawing, is the differing shape, i.e., differing bluntness, of the contoured regions provided at the various sections of the leading edge portions of the main wing structrue 117. See, for example, section 132(c) as its contoured shape varies from the outboard perimeter at leading edge fence 140(d), to the inboard perimeter at leading edge fence 140(c).

This FIG. 9 is a partial view, not showing all of the contoured surface regions or step changes; however, the step changes in chord length shown should be sufficient to illustrate this component of our invention. The precise configuration of each contoured surface region, for example, sections 132(a) through (d), is not critical. Yet, each contoured surface region should be configured and arranged to provide a localized air flow pattern which produces an aerodynamic pressure profile, normally including a localized pressure increase or pressure spike, to achieve the desired stall condition at a given angle of attack. Ideally, stall conditions are configured to provide a wing with stability in pitch at increasing angles of attack.

Figure 10:
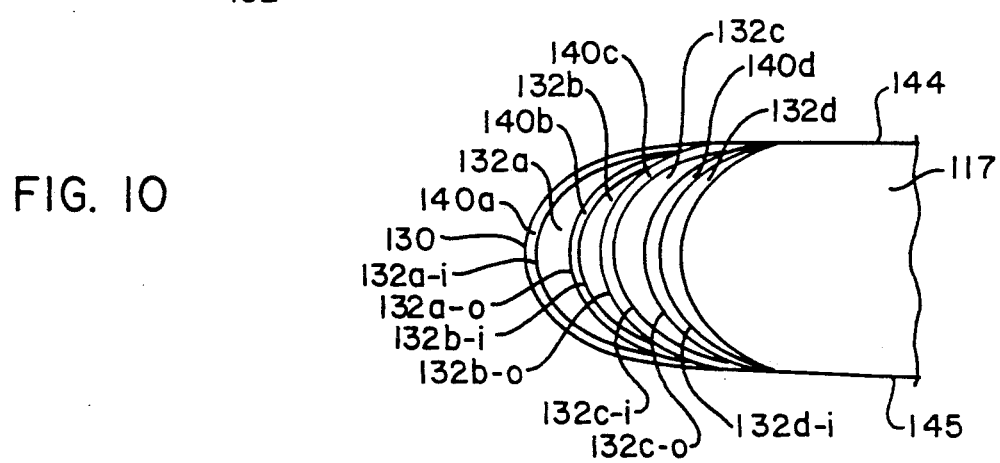
FIG. 10 is a partial cross-sectional view of wing surfaces, showing a series of abrupt chord changes provided in a wing section in an embodiment of the present invention, taken through the line X-10 of FIG. 8.

Turning now to FIG. 10, a partial cross-sectional view is illustrated of the main wing structure 117 of airfoil 112. A series of contoured surface regions are first illustrated, as they appear spanwise inwardly from line X-10 of FIG. 8. Looking inboard from the referenced section, the contoured surface region or nose 132(d) is first seen as it slants inwardly and forwardly. Next, the leading edge fence 140(d) is seen. Then, the inwardly slanting surface of the contoured surface region or nose 132(c) is seen. This, of course, is followed by the next leading edge fence, 140(c). The subsequent contoured surface portions through fence 140(a) are similarly surface portions through fence 140(a) are similarly illustrated.

The inboard and outboard perimeter of each of the contoured surfaces regions 132(a) through (d) are identified in this FIG. 10. The suffix "i", e.g., 132(a-i), indicates an inboard perimeter and the suffix "o", e.g., 132(a-o), are used to designate an outboard perimeter.

Part of this invention resides in the discovery that the shape of contoured surface regions, e.g., 132(a) through 132(d) may be varied as required to provide the desired aerodynamic pressure characteristics along the leading edge portion of main wing structure 117. By increasing the bluntness of a particular contoured surface region, for instance by adjusting the curvature of the nose of contoured surface region 132(b) [shown in FIG. 10 with in inboard perimeter at 132(b-i) and an outboard perimeter at 132(b-o)], the aerodynamic pressure on the leading edge can be increased or reduced as appropriate. Where the bluntness of a nose, i.e., leading edge location on a contoured surface region is increased, the aerodynamic pressure is locally increased, and a boundary layer separation will occur at a lower angle of attack Alpha ($\alpha$). Thus, there is a localized loss of lift as the wing section at the locally contoured surface region stalls. By providing contoured surface regions at appropriate spanwise locations along the wing 112, the stall behavior of sufficient spanwise locations, relative to increasing angle of attack Alpha ($\alpha$) can be regulated, to minimize or eliminate migration of the center of lift LW of wing 112. As a result, improved pitch stability can be achieved in aircraft 116.

Attention is now directed to FIG. 11. Here, a portion of the inboard portion of main wing structure 117 first illustrated in FIG. 8 is now shown in the cruise configuration. Here, leading edge slats 118 are retracted and fit into a clean aerodynamic profile with main wing structure 117. Clearly shown are the leading edge 154 of leading edge slats 118; in a cruise condition, edge 154 becomes the leading edge of wing 112. Also, the upper rear edge portion 150 of slats 118 can be seen cleanly blending aerodynamically into the upper aerodynamic surface 144.

Also illustrated in FIG. 11 is that the contoured surfaces 132(a) through 132(d) are now completely hidden beneath slats 118 in this cruise position. Thus, no drag penalty is experienced at cruise, either from the contoured surfaces 132(a) through 132(d), or from the leading edge fences 140(a) through 140(d) as is the case with many prior devices.

Figure 12:
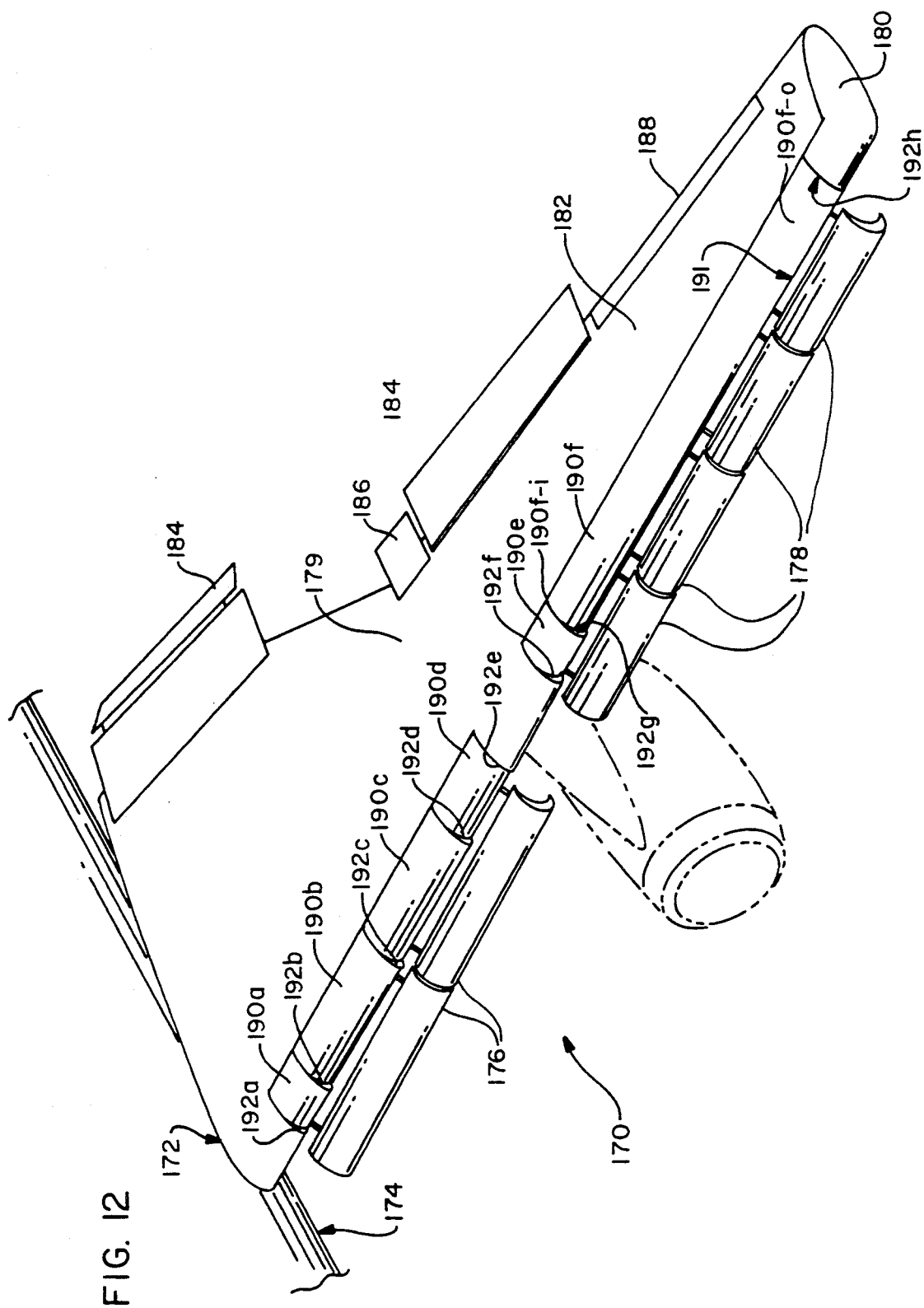
FIG. 12 illustrates one embodiment of our invention where a step change in the fixed main wing chord is provided on an outboard wing section.

Turning now to FIG. 12, another embodiment of the present invention is illustrated. The main feature additional to the earlier illustrated embodiments is the use of a contoured surface region on the outboard portion of a wing. Here, wing 170 is shown attached at a root portion 172 to a fuselage 174 of aircraft 175 (not shown). Located in a forward, deployed, high lift configuration are inboard slats 176 and outboard slats 178. Between the wing tip 180 and wing root 172 the main wing 179 has an upper aerodynamic surface 182. Located along the rear of the wing are a pair of trailing edge flaps 184. Also shown are inboard aileron 186 and outboard aileron 188. The configuration illustrated would be typical for an aircraft in a high lift configuration for takeoff or landing.

A series of contoured surface portions of main wing 179 are illustrated as contoured surface segments 190(a) through 190(f). Actually, portion 190(f) appears in a rather normal configuration having a relatively sharp nose 191 at its outboard perimeter 190(f-o); however, it can be seen that the bluntness of nose 191 is slightly increased at the inboard perimeter 190(f-i).

Also illustrated in this FIG. 12 are a series of leading edge fences which occur as a result of offset of a series of shaped, contoured surface regions. These leading edge fences are identified at the inboard portion of the wing as 192(a) through (e).

Additional in this embodiment are outboard leading edge fences 192(f) through (h), which are illustrative of any number of such devices which may be provided at appropriate locations. While one aspect of our invention has been to create a partial wing stall on the inboard section of a wing at appropriate angles of attack Alpha ($\alpha$) so as to minimize adverse nose-up pitching moment, another element of our invention is to place a series of outboard leading edge stall fences, such as 192(f), along an outboard airfoil portion to minimize the inward and forward migration of an outboard stall, i.e., to delay the progression toward full stall at an outboard portion of the airfoil until a slightly higher angle of attack Alpha ($\alpha$).

As noted above, apparatus which may be provided by the present invention to achieve desired pitch stability in an aircraft by modification of stall characteristics may include (1) varying the bluntness of a contoured surface region of the main wing structure, (2) changing the slot-gap width between the leading edge portion of the main wing structure and the leading edge slat, and (3) a step change in the chord length of the main wing structure when examined in a spanwise profile between the root and tip.

Figure 13:
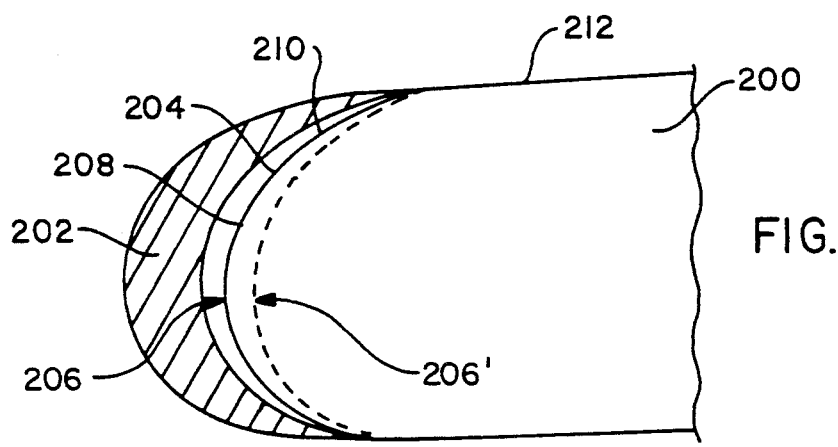
FIG. 13 is a partial cross-sectional view of wing surfaces in another embodiment of the present invention, showing various contours or bluntness of nose portions of a wing.

With regard to the term "blunt" or "bluntness," possibly this could be clarified by reference to FIG. 13. It can be seen that there is a main wing structure 200 having a movable leading edge member or flap 202 which is shown in its stowed position. There is a gap defining region 204 on a portion of main wing structure 200, and this gap defining surface region 204 is shown in full lines in its optimized configuration, where it forms a continuous aerodynamic surface over which there is attached air flow when the wing is at an angle of attack within a predetermined range. The gap defining surface region 204 has a nose or leading edge portion 206 where the curvature is relatively sharp, and proceeding upwardly along the surface 204 to the region indicated at 208, the radius of curvature becomes larger (i.e., the curvature is less sharp). At a location on the surface at 210 which is quite close to the location at which the trailing edge of the flap 202 meets the upper surface of the main wing upper surface 212, the curvature becomes somewhat sharper.

If the nose portion 206 is moved rearwardly to the broken line configuration shown at 206', it can be seen that the curvature of the gap defining surface region is modified. The radius of curvature at the nose or leading edge 206' will become greater (i.e., the curvature less sharp), and the curvature at the area 210 becomes sharper. This is the configuration where the forward portion of the main wing structure becomes more "blunt." It should be noted that making the gap defining surface region 204 more blunt could possible be accomplished without actually reducing the minimum width of the gap that is formed when the flap 202 is in its deployed position.

When the gap defining surface region 204 is made more blunt (as described with reference to FIG. 13), there would be a greater pressure spike at the area of curvature 210, and the effect of this is that flow separation would occur at the aft portion of the upper surface of the main wing structure 200 at a lower angle of attack than it would if the gap defining surface region 204 were at its optimized configuration.

Turning now to FIG. 14, a number of embodiments of the present invention are illustrated. While each embodiment may be used alone in an aircraft wing, it is also quite feasible for several different embodiments to be utilized spanwise along the wing of a particular aircraft, in order to achieve the desired stall recovery characteristics. However, it is not intended to suggest that the sequence of embodiments illustrated in this FIG. 14 represent an optimizing wing design; rather, the various embodiments are concisely presented in this FIG. 14 for illustration and comparison, so that it is clearly understood that many combinations of embodiments may be utilized to achieve optimum results as taught herein when applying our designs and methods to a particular aircraft design.

In FIG. 14 there is shown a swept wing airfoil 222 which is attached at the extreme inboard wing end at root 224 to the side of a fuselage 225 of aircraft 226 (not shown). Most of wing 222 is comprised of a fixed main wing structure 227. Attached to wing structure 227 are movable leading edge members 228, i.e. slats, here shown in their forwardly and downwardly deployed high lift positions. A spanwise gap 229 in slat placement exists where engine 230 is attached to main wing structure 227. Also shown attached to the trailing edge portion 232 of the main wing structure 227 are trailing edge flaps 234, an inboard aileron 236, and an outboard aileron 237. Wingtip 238 forms the extreme outboard end of main wing structure 227.

Spanwise across leading edge 238 of main wing structure 227, a slot gap 240 is formed between the main wing structure 227 and slats 228. Different embodiments of the present invention are illustrated for varying, spanwise, the width, cross-sectional area, and thus the resultant airflow through slot-gap 240. Such variations can be utilized to create stall characteristics in wing 222 which improve pitch stability of aircraft 226, with minimum loss of maximum lift coefficient.

Different embodiments, or leading edge design elements, which may be utilized in configuring a wing design in accord with the principles of the present invention are illustrated in this FIG. 14, and include the following:

"$A_1$" —Leading edge portion in conventional location, of bluntness as normally selected to provide optimum lift coefficient.

"$A_2$" —Leading edge portion in conventional location, with bluntness increased over that normally selected for "$A_1$" design.

"$B_1$" —Leading edge portion with varying slot gap width, wherein the portion starts at a normal leading edge location at the outboard end, and, within said portion, the slot gap is increasingly wider when examined spanwise from outboard to inboard.

"$B_2$" —Leading edge portion with varying slot gap width, wherein the portion starts rearward from a normal leading edge location at the outboard end, and, within said portion, the inboard slot gap is increasingly wider when examined spanwise from outboard to inboard.

"$C_1$" —Leading edge portion with uniform slot gap width, with the leading edge of said leading edge portion located aft of a normal leading edge location which would be selected to provide optimum lift coefficient, and wherein a conventional leading edge location is immediately adjacent to the inboard and outboard ends of the $C_1$ leading edge portion.

"$C_2$" —Leading edge portion with uniform slot gap width, with the leading edge of said leading edge portion located aft of a normal leading edge location which would be selected to provide optimum lift coefficient, and wherein either a type $B_1$ or $B_2$ (wider inboard slot gap) leading edge portion is located at the outboard end of said $C_2$ leading edge portion.

"$D_1$" —Leading edge portion with varying slot gap width, wherein the portion starts at a normal leading edge location at the inboard end, and, within said portion, the slot gap is increasingly wider when examined spanwise from inboard to outboard.

"$D_2$" —Leading edge portion with varying slot gap width, wherein the portion starts rearward from a normal leading edge location at the inboard end, and, within said portion, the slot gap is increasingly wider when examined spanwise from inboard to outboard.

Note that leading edge fences formed by juxtaposition of the various leading edge portions just described may involve "inboard fences" such as that identified as 242 between portions $A_1$, and $B_1$, or "outboard fences" such as that identified as 244, located near the outboard end of main wing 227, between portions $B_2$ and $A_1$. Also, for reference, where a leading edge location in an embodiment of the present invention is rearward of a theoretical or normal leading edge location, the "normal," conventionally expected leading edge location is indicated by a series of dashed lines.

By contouring the shape of the leading edge portion of the fixed main wing structure as herein described, a stall pattern for the inboard wing portion can be achieved at desired angles of attack Alpha ($\alpha$). By matching the stall characteristics and progression (with respect to angle of attack) on the inboard wing portion with the stall characteristics and progression on the outboard wing portion, a forward migrating center of lift LW of the wing can be avoided. Thus, adverse nose-up pitching moment can be minimized or eliminated, particularly in swept wing aircraft.

Figure 15:
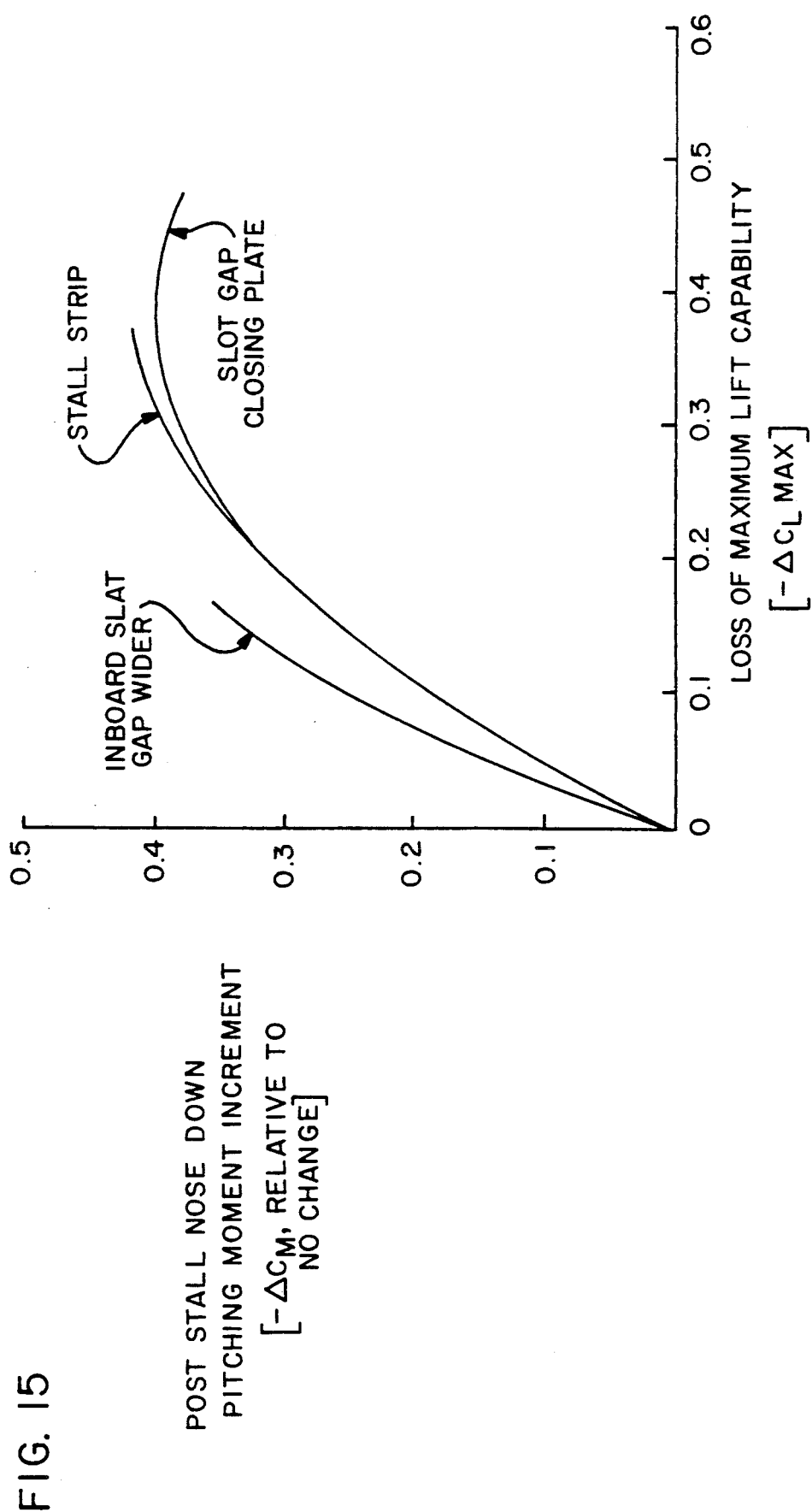
FIG. 15 is a graph which illustrates wind tunnel test results for one embodiment of the present invention, as compared to earlier devices.

The improvement in the state of the art which is provided by the present invention is readily apparent from experimental wind tunnel tests which we have conducted, the results of which are graphically illustrated in FIG. 15. In FIG. 15, a plot is shown of the post stall nose down pitching moment increment, $\Delta C_m$, (relative to no change in pitching moment) versus the incremental loss of maximum lift capability, $\Delta C_l$, (relative to no loss of lift) for various devices, including: (a) a slot gap closing plate, (b) a stall strip, and (c) a variable slot gap width device wherein the inboard slat gap width is larger than the outboard slot gap width. The latter device, (c), is of course one embodiment of the present invention. The slot gap closing plate, (a), is typical of a prior art type of device illustrated above as plate 62 in FIG. 4. The stall strip, (b), is typical of a prior art type of device illustrated above as stall control device or stall strip 90 in FIGS. 5 and 6.

As can be clearly seen in FIG. 15, device (c), a variable slot gap width device having a wider inboard slot gap, provides significantly improved stall recovery characteristics (i.e., more nose down pitching moment at equivalent loss of lift) than the other devices illustrated. It is also to be noted that in the present invention, the improved stall recovery characteristics are provided with less impairment of the maximum lifting capability of the wing than in prior art designs which are known to us. This particular combination of improved stall recovery characteristics with minimum loss of maximum lift capability in a wing is of great importance. This is because improved stall recovery characteristics are provided without the necessity for appreciable increases of airspeed during approach for landing, i.e., a high maximum lift coefficient is maintained while providing desirable pitching moment characteristics at stall recovery.

The present invention offers a number of advantages over the prior art devices which are known to us. First, the contouring of sections of the leading edge portions of the main wing structure does not significantly block the airflow through the slot-gap, and as a result, the tail control surfaces of an aircraft are not adversely affected. Also, there are no "add-on" flow disturbing devices provided on the leading edge portions of the main wing structure to protrude into the airflow or to require fastener penetration into the leading edge. Thus, in the airflow direction (i.e., forward to rearward), a continuous, smooth surface is presented. This is particularly important for "T-tail" type aircraft commonly used for high speed subsonic passenger transport. Also, the effect of a leading edge fence in providing localized separation of boundary layer is achieved without incurring a drag penalty at cruise as has been the case with prior art leading edge fences. This is because in a wing design according to the present invention, leading edge fences are covered by the leading edge slat when the slat is in the cruise configuration. Further, since the leading edge fence is located on the main wing surface, rather than on the slat, it is more effective in the high lift takeoff and landing configurations than the slat mounted leading edge fences provided by others.

As mentioned above, the various features which have been disclosed herein may be varied to suit the requirements of a particular wing or for the use of a particular wing on a particular aircraft. However, once the desired effect has been theoretically determined, empirical studies such as wind tunnel tests can be utilized to determine the exact configuration which provides the desired stall characteristics in a particular wing design.

It is to be understood that the stall control apparatus and method illustrated herein have been illustrated somewhat schematically, and the depicted arrangements may be optimized in various aircraft designs to produce the desired aerodynamic stability.

It will be apparent after studying the drawings and reading the description of the various embodiments that changes may be made in the arrangement and positioning of the components within the spirit and scope of the invention. Thus, the foregoing description of embodiments of the invention have been presented for purposes of illustration and description and for providing an understanding of the invention. It is not intended to be exhaustive or to limit the invention to the precise forms disclosed. Obviously, many modifications and variations are possible in light of the above teaching. The particular embodiments were chosen and described in some detail to explain the principles of the invention and its practical application to thereby enable others skilled in the relevant art to utilize the invention in various embodiments and with various modifications as are suited to the particular use contemplated. Changes and modifications from the specifically described embodiments and methods can be carried out without departing from the scope of the invention. It is intended that the scope of the invention be indicated by the appended claims rather than by the foregoing description; and all changes which come within the meaning and range of equivalency of the claims are therefore intended to be embraced therein.

What is claimed is:

1. In a wing of an aircraft where the wing comprises:
   a. a main wing structure having a leading edge portion, a trailing edge portion, an upper aerodynamic surface, a lower aerodynamic surface, and a forward gap forming surface portion which extends along the leading edge;
   b. a leading edge member which is movable between a stowed position for cruise mode where the leading edge member aerodynamically conceals said gap forming surface portion, and a deployed position for high lift mode where the leading edge member forms with the gap forming surface portion a slot for passage of air upwardly therethrough and over the upper surface of the wing structure; and
   c. said wing structure being characterized in that said gap forming surface portion has an optimized continuous aerodynamic base surface contour to optimize airflow through the slot relative to drag and lift coefficient, and said wing structure being further characterized in that within a predetermined range of high angles of attack and with the leading edge member in the deployed position, and with the gap forming surface portion having said optimized aerodynamic base surface contour at first and second spanwise locations of the wing, there is an aerodynamic condition of initial stall at said first spanwise location, without a corresponding condition of stall developing at the second spanwise location, with said aerodynamic condition producing an undesired pitching moment;

the improvement comprising:
   a. a first section of said gap forming surface portion at said first spanwise location having an actual first continuous surface contour region corresponding to said optimized continuous aerodynamic surface contour;
   b. a second section of said gap forming surface portion at said second spanwise location having an actual second surface contour region, at least a portion of which is spaced further from said leading edge member than said optimized continuous aerodynamic surface contour in a manner that within said range of high angles of attack, separated flow develops initially at a rear region of said upper aerodynamic surface of said main wing structure at said second spanwise location to develop a condition of stall at said second spanwise location corresponding to said condition to stall at said first spanwise location in a manner that said undesired pitching moment is alleviated;

c. said second surface contour region being stepped from said first surface contour region and having a configuration such that said slot at said second surface contour region has a cross-sectional flow area greater than a slot configuration which would be formed under a circumstance where said second surface contour region would be the same as said optimized continuous aerodynamic surface contour.

2. The improvement as recited in claim 1, wherein said second surface contour region has a configuration where a portion of said second surface contour region that leads to said upper aerodynamic surface has increased bluntness relative to said optimized continuous aerodynamic surface contour to cause a localized pressure spike which results in said separated air flow.

3. The aircraft as set forth in claim 1, wherein said leading edge portion of said main wing structure has a configuration for developing said desirable stall characteristics that comprises a chord length distribution, when examined spanwise, in which at least one step change in chord length occurs, said step change in chord length provided by a step change in said leading edge portion between adjoining surface contoured regions.

4. The improvement as recited in claim 3, wherein said step change in chord length along said leading edge portion of said main wing structure is exposed to airflow when said movable leading edge member is in said deployed position, and wherein said step change in chord length along said leading edge portion of said main wing structure is concealed by said movable leading edge member when said member is in said stowed, cruise position.

5. The improvement as recited in claim 1, wherein said wing is a swept wing, and said first spanwise location is at an outboard location of the wing, and said second spanwise location is at an inboard location of said wing.

6. An aircraft comprising a fuselage, sweptback wings extending laterally from a wing root to a wing tip at both sides of said fuselage, each of said wings comprising:

a. a main wing structure having a leading edge portion, a trailing edge portion, an upper aerodynamic surface, a lower aerodynamic surface, and a forward gap forming surface portion which extends along the leading edge;

b. a leading edge member which is movable between a stowed position for cruise mode where the leading edge member aerodynamically conceals said gap forming surface portion, and a deployed position for high lift mode where the leading edge member forms with the gap forming surface portion a slot for passage of air upwardly therethrough and over the upper surface of the wing structure; and c. said main wing structure located rearward from said movable leading edge members, said main wing structure further comprised of a spanwise sequence of adjacent leading edge portions and wherein said sequence of leading edge portions is arranged from the wing root to the wing tip and is described by the sequence:

$X_1, X_2, \ldots X_n.$ i. wherein n is a positive integer greater than or equal to three (3); and
ii. wherein any of $X_1$, $X_2$, through $X_n$ may be selected from the following:
   a. $A_1$, a first leading edge portion selected with a bluntness for optimum lift coefficient, said first leading edge portion located in first leading edge portion location which provides optimum gap width of said slot;
   b. $A_2$, a second leading edge portion selected with a bluntness increased over that which would be selected for optimum lift coefficient, said second leading edge portion located in a second leading edge portion location which provides optimum gap width of said slot;
   c. $B_1$, a third leading edge portion, said portion having an inboard and an outboard end and a leading edge forming section therebetween, said portion arranged to provide varying width slot gap, wherein said slot gap width is wider at the inboard end than at the outboard end;
   d. C, a fourth leading edge portion, said portion having an inboard and an outboard end and a leading edge forming section therebetween, wherein said leading edge forming section is parallel to but rearward of a location which would provide optimum slot gap width; and
   e. D, a fifth leading edge portion, said portion having an inboard and an outboard end, said portion arranged to provide varying width slot gap, wherein said slot gap width is wider at the outboard end than at the inboard end.

7. In a wing of an aircraft where the wing comprises:
a. a main wing structure having a leading edge portion, a trailing edge portion, an upper aerodynamic surface, a lower aerodynamic surface, and a forward gap forming surface portion which extends along the leading edge;
b. a leading edge member which is movable between a stowed position for cruise load where the leading edge member aerodynamically conceals said gap forming surface portion, and a deployed position for high lift load where the leading edge member forms with the gap forming surface portion a slot for passage of air upwardly therethrough and over the upper surface of the wing structure; and
c. said wing structure being characterized in that said gap forming surface portion has an optimized continuous aerodynamic surface contour to optimize airflow through the gap relative to drag and lift coefficient, said wing structure being further characterized in that within a predetermined range of high angles of attack and with the leading edge member in the deployed position, and with the gap forming surface portion having said optimized aerodynamic surface contour at first and second spanwise locations of the wing, there is an aerodynamic condition of initial stall at said first spanwise location, without a corresponding condition of stall developing at the second spanwise location, with said aerodynamic condition producing an undesired pitching moment;

a method of alleviating said undesired pitching moment, said method comprising:

a. providing a first section of said gap forming surface portion at said first spanwise location having a first continuous surface contour region corresponding to said optimized continuous aerodynamic surface contour;

b. providing a second section of said gap forming surface portion at said second spanwise location having a second surface contour region, at least a portion of which is located rearward from a location which would be occupied by an optimized continuous aerodynamic surface contour if it were present at said first contour region; and c. positioning the leading edge member in its deployed position so that said second surface contour region is exposed aerodynamically to airflow in said slot to create an aerodynamic pressure profile along the span of said wing in a manner that within said range of high angles of attack, separated flow develops initially at a rear region of said upper aerodynamic surface of said main wing structure at said second spanwise location to develop a condition of stall at said second spanwise location corresponding to said condition to stall at said first spanwise location.

8. The method as recited in claim 7, wherein said second surface contour region has a configuration such that said gap at said second surface contour region has a cross-sectional flow area greater than a gap configuration which would be formed under a circumstance where said second surface contour region would be the same as said optimized continuous aerodynamic surface contour.

9. The method as recited in claim 7, wherein said second surface contour region has a configuration where a portion of said second surface contour region that leads to said upper aerodynamic surface has increased bluntness relative to said optimized continuous aerodynamic surface contour to cause a localized pressure spike which results in said separated air flow.

10. The method as set forth in claim 7, wherein said leading edge portion of said main wing structure has a configuration for developing said desirable stall characteristics that comprises a chord length distribution, when examined spanwise, in which at least one step change in chord length occurs, said step change in chord length provided by a step change in said leading edge portion between adjoining surface contoured regions.

11. The method as recited in claim 7, wherein said step change in chord length along said leading edge portion of said main wing structure is exposed to airflow when said movable leading edge member is in said deployed position, and wherein said step change in chord length along said leading edge portion of said main wing structure is concealed by said movable leading edge member when said member is in said stowed, cruise position.

12. The method as recited in claim 7, wherein said wing is a swept wing, and said first spanwise location is at an outboard location of the wing, and said second spanwise location is at an inboard location of said wing.

13. A method for design of a wing for an aircraft where the wing comprises:

a. a main wing structure having a leading edge portion, a trailing edge portion, an upper aerodynamic surface, a lower aerodynamic surface, and a forward gap forming surface portion which extends along the leading edge;

b. a leading edge member which is movable between a stowed position for cruise load where the leading edge member aerodynamically conceals said gap forming surface portion, and a deployed position for high lift load where the leading edge member forms with the gap forming surface portion a slot for passage of air upwardly therethrough and over the upper surface of the wing structure; and c. said wing structure being characterized in that said gap forming surface portion has an optimized continuous aerodynamic surface contour to optimize airflow through the gap relative to drag and lift coefficient, said wing structure being further characterized in that within a predetermined range of high angles of attack and with the leading edge member in the deployed position, and with the gap forming surface portion having said optimized aerodynamic surface contour at first and second spanwise locations of the wing, there is an aerodynamic condition of initial stall at said first spanwise location, without a corresponding condition of stall developing at the second spanwise location, with said aerodynamic condition producing an undesired pitching moment;

said method comprising the steps of:

a. determining the angle of attack at which a stall occurs on said outboard portion of said wing;

b. determining the pitching moment experienced by said aircraft due to stall on the outboard portion of said wing as a function of increasing angle of attack;

c. providing contoured surface portions at selected locations along said main wing structure, said contoured surface portions adapted to create localized variations in aerodynamic pressure along the span of the wing, whereby a stall pattern is created along said inboard section which roughly balances, at least in terms of pitching moment provided to said aircraft, the simultaneously occurring pitching moment produced by the stall pattern experienced in said outboard wing section, so that the center of lift of said wing does not migrate longitudinally to an extent which adversely degrades pitch stability, thereby avoiding said undesired pitching moment, wherein said contoured surface portions are selected from one or more of the following:

a. $A_1$, a first leading edge portion selected with a bluntness for optimum lift coefficient, said first leading edge portion located in first leading edge portion location which provides optimum gap width of said slot;

b. $A_2$, a second leading edge portion selected with a bluntness increased over that which would be selected for optimum lift coefficient, said second leading edge portion located in a second leading edge portion location which provides optimum gap width of said slot;

c. $B_1$, a third leading edge portion, said portion having an inboard and an outboard end and a leading edge forming section therebetween, said portion arranged to provide varying width slot gap, wherein said slot gap width is wider at the inboard end than at the outboard end;

d. C, a fourth leading edge portion, said portion having an inboard and an outboard end and a leading edge forming section therebetween, wherein said leading edge forming section is parallel to but rearward of a location which would provide optimum slot gap width; and e. D, a fifth leading edge portion, said portion having an inboard and an outboard end, said portion arranged to provide varying width slot gap, wherein said slot gap width is wider at the outboard end than at the inboard end.

14. A method for design of a wing for an aircraft where the wing comprises:

a. a main wing structure having a leading edge portion, a trailing edge portion, and upper aerodynamic surface, a lower aerodynamic surface, and a forward gap forming surface portion which extends from a leading edge location upwardly and rearwardly to an upper surface location;

b. a leading edge member which is movable between a stowed position for cruise load where the leading edge member aerodynamically conceals said gap forming surface portion, and a deployed position for high lift load where the leading edge member forms with the gap forming surface portion a slot for passage of air upwardly therethrough and over the upper surface of the wing structure; and c. said wing structure being characterized in that said gap forming surface portion has an optimized continuous aerodynamic surface contour to optimize airflow through the gap relative to drag and lift coefficient, said wing structure being further characterized in that within a predetermined range of high angles of attack and with the leading edge member in the deployed position, and with the gap forming surface portion having said optimized aerodynamic surface contour at first and second spanwise locations of the wing, there is an aerodynamic condition of initial stall at said first spanwise location, without a corresponding condition of stall developing at the second spanwise location, with said aerodynamic condition producing an undesired pitching moment;

said method comprising the steps of:

a. determining the angle of attack at which a stall occurs on said outboard portion of said wing;

b. determining the pitching moment experienced by said aircraft due to stall on the outboard portion of said wing as a function of increasing angle of attack;

c. providing a contoured surface portion at selected locations along said main wing structure, said contoured surface portion adapted to create localized variations in aerodynamic pressure along the span of the wing, whereby a stall pattern is created along said inboard section which roughly balances, at least in terms of pitching moment provided to said aircraft, the simultaneously occurring pitching moment produced by the stall pattern experienced in said outboard wing section, so that the center of lift of said wing does not migrate longitudinally to an extent which adversely degrades pitch stability, thereby avoiding said undesired pitching moment, said localized variations in aerodynamic pressure on said fixed forward leading edge being provided by a spanwise change in slot-gap width so as to increase said slot gap width.

15. The method of claim 14, wherein said localized variation in aerodynamic pressure on said forward leading edge portion is provided by a step change in chord length, said step change in chord length occurring between adjacent contoured surface regions.

16. The method as recited in claim 14, wherein said surface contoured regions are exposed to airflow when said movable leading edge member is in said deployed position, and wherein said surface contoured regions are concealed by said movable leading edge member when said member is in said stowed, cruise position.

17. The method as recited in claim 14, wherein said wing is a swept wing, and said first spanwise location is at an outboard location of the wing, and said second spanwise location is at an inboard location of said wing.

* * * * *